United States Patent
Haberstroh

(10) Patent No.: US 7,841,235 B2
(45) Date of Patent: Nov. 30, 2010

(54) SUPERCONDUCTIVE LEVEL INDICATOR FOR LIQUID HYDROGEN AND LIQUID NEON, AND MEASURING METHOD FOR LIQUID LEVEL MEASUREMENT

(75) Inventor: Christoph Haberstroh, Dresden (DE)

(73) Assignee: Technische Universität Dresden, Dresden (DE)

( * ) Notice: Subject to any disclaimer, the term of this patent is extended or adjusted under 35 U.S.C. 154(b) by 489 days.

(21) Appl. No.: 11/817,828

(22) PCT Filed: Mar. 2, 2006

(86) PCT No.: PCT/DE2006/000408
§ 371 (c)(1),
(2), (4) Date: Sep. 5, 2007

(87) PCT Pub. No.: WO2006/094489
PCT Pub. Date: Sep. 14, 2006

(65) Prior Publication Data
US 2008/0148844 A1    Jun. 26, 2008

(30) Foreign Application Priority Data
Mar. 5, 2005   (DE) ................. 10 2005 010 977

(51) Int. Cl.
*G01F 23/22* (2006.01)
(52) U.S. Cl. ........................................ 73/295
(58) Field of Classification Search ............... 73/295, 73/304 R; 505/160, 842
See application file for complete search history.

(56) References Cited

U.S. PATENT DOCUMENTS 3,496,773 A * 2/1970 Cornish ................... 73/295
3,699,647 A * 10/1972 Bidault et al. ............ 29/599
3,943,767 A * 3/1976 Efferson .................. 73/295
4,118,984 A * 10/1978 Kuraoka et al. .......... 73/295
4,330,347 A * 5/1982 Hirayama et al. ........ 428/611
4,449,403 A * 5/1984 McQueen ................. 73/295

(Continued)

FOREIGN PATENT DOCUMENTS

DE    26 15 407 A1    10/1977

(Continued)

OTHER PUBLICATIONS

Das, S., The Sensible Superconductor, IEEE Spectrum IEEE, USA, vol. 39, No. 7, Jul. 2002, XP002387954, pp. 34-37.

(Continued)

*Primary Examiner*—John Fitzgerald
(74) *Attorney, Agent, or Firm*—Antonelli, Terry, Stout & Kraus, LLP.

(57) ABSTRACT

The invention relates to a superconducting level measuring apparatus for liquid hydrogen in liquid hydrogen vessels, in particular vehicular tanks, a superconductor (1) based on magnesium diboride $MgB_2$ being arranged vertically or inclinedly to the vertical in a liquid hydrogen vessel (5), and a controllable heat source (2) being arranged on the upper region of the superconductor (1), the superconductor (1) being electrically contacted with a controllable current source (3) as well as a voltage measuring apparatus (4) and the level being measured by measuring a voltage. The $MgB_2$ material is preferably employed as a filament wire. Continuous level measurements of high spatial and temporal resolution can be implemented in uncomplicated fashion. The level measuring apparatus and the method are also suitable for level measurement of liquid neon.

11 Claims, 2 Drawing Sheets

U.S. PATENT DOCUMENTS

Figure 1:
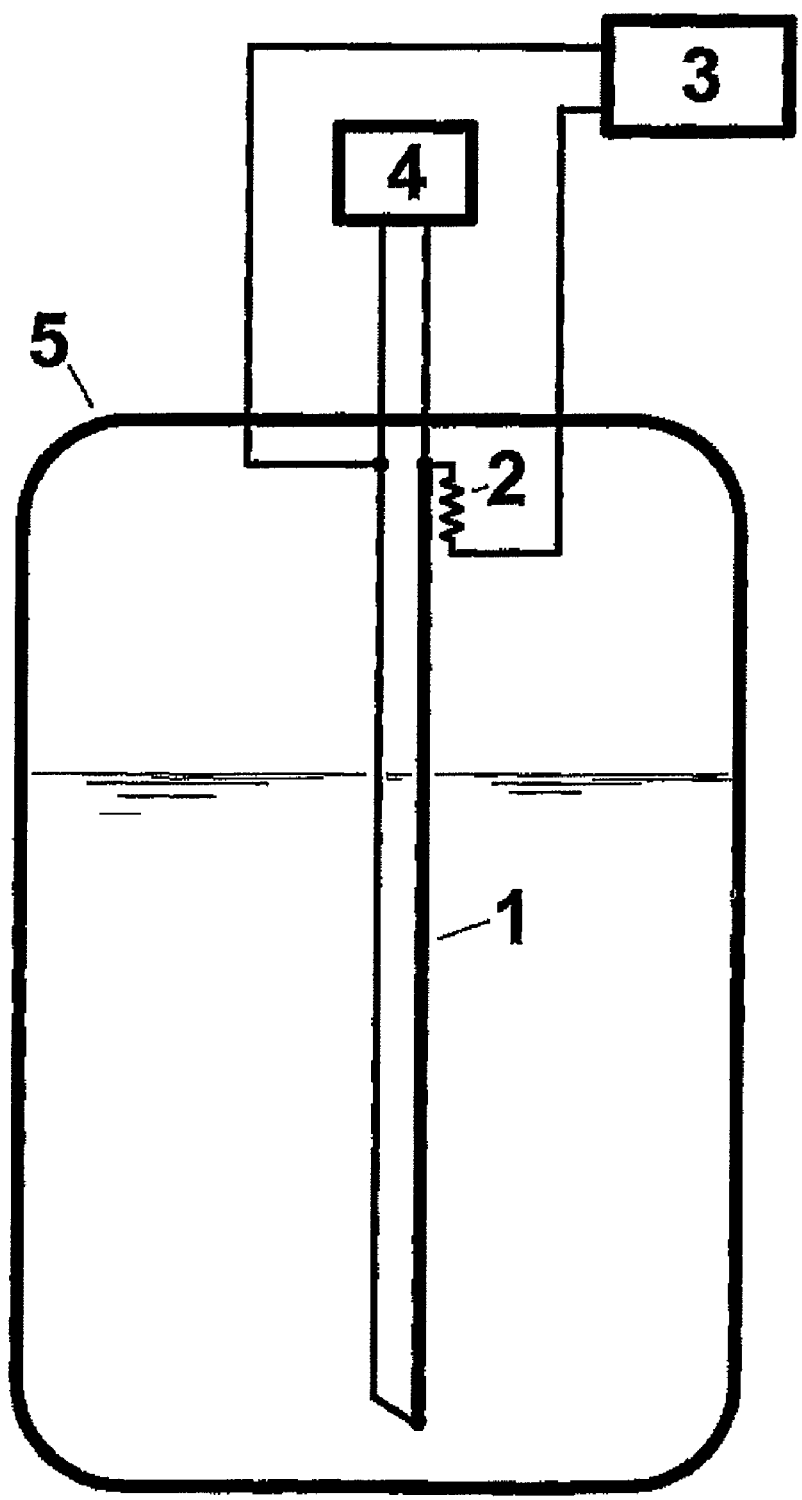

| | | | |
|---|---|---|---|
| 4,655,079 A * | 4/1987 | Masumoto et al. | 73/295 |
| 4,745,806 A * | 5/1988 | Masumoto et al. | 73/295 |
| 4,944,183 A * | 7/1990 | Masumoto et al. | 73/295 |
| 5,018,387 A * | 5/1991 | Myneni | 73/295 |
| 5,114,907 A * | 5/1992 | Erwin et al. | 505/160 |
| 5,393,736 A * | 2/1995 | Hodge et al. | 505/160 |
| 5,593,949 A * | 1/1997 | Leung et al. | 505/160 |
| 5,744,945 A * | 4/1998 | Hodge et al. | 324/71.6 |
| 6,925,873 B2 * | 8/2005 | Xu et al. | 73/304 R |
| 2004/0226364 A1* | 11/2004 | Xu et al. | 73/304 R |
| 2005/0174202 A1* | 8/2005 | Tanaka et al. | 335/6 |
| 2008/0156091 A1* | 7/2008 | Hickman et al. | 73/304 R |

FOREIGN PATENT DOCUMENTS

| | | | |
|---|---|---|---|
| JP | 01138423 A | * | 5/1989 |
| JP | 01138424 A | * | 5/1989 |
| JP | 2007040825 A | * | 2/2007 |

OTHER PUBLICATIONS

Goldracker, et al., Development of Superconducting and Cryogenic Technology in the Institute for Technical Physics (ITP) of the Research Center Karlsruhe, Cryogenics, Elsevier Vo. 42, No. 12, Dec. 2002, XP004409051, pp. 735-770.

Efferson, K., A Superconducting (Nb-Ti) Liquid Helium Level Detector, Advances in Cryogenic Engineering, vol. 15, 1970, XP009068560, ISBN 0-306-38015-3, pp. 124-131.

* cited by examiner

SUPERCONDUCTIVE LEVEL INDICATOR FOR LIQUID HYDROGEN AND LIQUID NEON, AND MEASURING METHOD FOR LIQUID LEVEL MEASUREMENT

BACKGROUND OF THE INVENTION

The invention relates to a superconducting level measuring apparatus for liquid hydrogen that can be used in the several application cases of storage, generation and consumption of liquid hydrogen. The superconducting level measuring apparatus is further usable for liquid neon. The invention further relates to a measuring method for measuring a liquid level.

Diverse methods and devices for measuring the level of cryogenic liquids in vessels, based on the most varied concepts, are quite generally known in the prior art.

DE 102 58 235 A1 discloses a level measuring apparatus for a vehicular liquid gas tank, in particular a vehicular liquid hydrogen tank, which has a wire strain gage arranged on the suspension of the inner tank and a pressure sensor arranged outside the vehicular tank and connected to the vehicular tank via a line, the strain gage and the pressure sensor each being connected to an on-board computer via a line. According to the above-cited publication, the level can be inferred indirectly by computational means from the measured total weight of the inner tank and the associated pressure. Doing so requires suitable software and calibration of the system.

This method further has the disadvantage that the side effects, in particular on the weight measurement, are so great that no reliable determination of the level is possible. The inaccuracies that arise, for example through continuously varying acceleration during driving, lead to interferences that make it impossible to determine the level reliably.

Further known in the prior art is the use of probes based on discrete sensors, wherein the presence of a gaseous or liquid phase can be established for the individual sensors. An inherent disadvantage here is the limitation to discrete measuring points; that is, the level necessarily cannot be tracked continuously. The generally large number of individual sensors required occasions a high expense; a complex control device is necessary, so that this method can be used to advantage only in a few cases.

The principle of the capacitive level probe has been technically implemented and is now widespread. Disadvantageous here are the large size and heavy weight of the probes and, what is more, the stringent requirements on manufacturing tolerances and dimensional stability in fabrication and later operation. Relatively low signal levels in the pF range must be employed, making the method costly in terms of apparatus and susceptible to interference. Further, the level actually to be determined can only be calculated indirectly from the measured capacitance and other parameters such as pressure and temperature; there are numerous interfering effects that make interpretation laborious and inaccurate. The difficulties stated constitute a substantial limitation on the current use of this method in the vehicular field.

Known from the prior art are level measuring apparatuses for other cryogenic liquids, in particular for liquid helium, which are based on the use of a superconducting material. The principle employed here is the inequality in heat transfer between the gas phase on the one hand and the liquid phase on the other. The superconducting material here is generally fashioned as a longitudinally extended conducting path in substantially vertical orientation. The transition temperature must be slightly above the boiling point of whatever cryogenic fluid is to be measured. The method rests on the fact that the superconducting material in the gas phase is held above the transition temperature, that is, in the normally conducting state, by deliberate input of heat. The portion of the superconductor located in the liquid phase remains in the superconducting state because of better cooling. The position of the liquid level can be inferred by measuring the electric resistance. Such superconducting level probes are described, for example, in DE 26 15 407 and U.S. Pat. No. 3,943,767. A fundamental description can be found in Efferson, K. R., "A Superconducting (Nb—Ti) Liquid Helium Level Detector," in Timmerhaus (ed.), *Advances in Cryogenic Engineering*, Plenum Press, Vol. 15 (1970), p. 15.

Further, WO 91/08449 discloses a level detector for cryogenic liquids, in particular liquid nitrogen, wherein the liquid level is detected through the use of the superconductivity effect with a superconductor from the group of high-temperature superconductors. A superconducting film is applied to a support with an intervening substrate such as an yttrium-stabilized $ZrO_2$ substrate. In a detection circuit, the changes in electric resistance in the superconducting material are acquired by a low-frequency sampling method and conditioned, a measuring current being routed through the superconducting film in pulse-clocked fashion and calibration pulses for the measuring circuit being provided between the measurement pulses.

The known level measuring devices using this principle are not, however, usable for liquid hydrogen. This is so because of the material properties of liquid hydrogen, which have heretofore blocked any use of this method.

BRIEF SUMMARY OF THE INVENTION

It is an object of the invention to furnish a level measuring apparatus for liquid hydrogen that makes possible a simple and reliable measurement in a liquid hydrogen vessel and in particular for use in liquid hydrogen supply tanks for motor vehicles.

With regard to concept, this object is achieved with a superconducting level measuring apparatus for liquid hydrogen that is based on the use of magnesium diboride ($MgB_2$) as superconducting material. This exhibits a transition temperature favorable to its use in liquid hydrogen tanks.

BRIEF DESCRIPTION OF THE SEVERAL VIEWS OF DRAWINGS.

Figure 2:
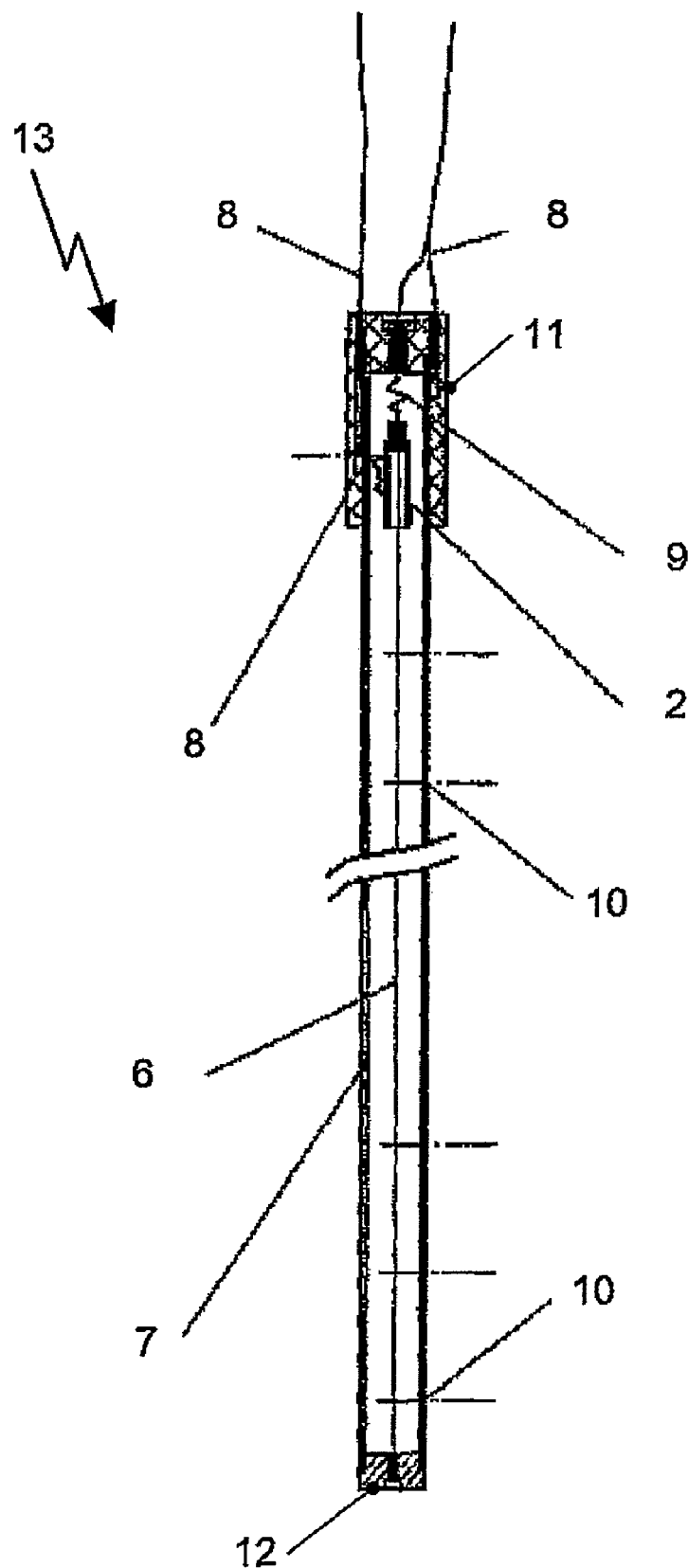

An advantageous development of the principle of the invention is illustrated in FIG. 1. By way of example, a level measuring probe is illustrated in FIG. 2.

DETAILED DESCRIPTION OF THE INVENTION

The object is achieved in particular with a level measuring apparatus for liquid hydrogen in liquid hydrogen vessels, in particular motor vehicle tanks, a superconductor 1 based on $MgB_2$ being arranged vertically or inclinedly to the vertical in tank 5, and a controllable heat source 2 being arranged on the upper region of superconductor 1, superconductor 1 being electrically contacted via wiring to a controllable current source 3 and a voltage measuring apparatus 4, and the level being measured by measuring a voltage.

Superconductor 1 based on $MgB_2$ is preferably fashioned as a filament wire. It is advantageously combined with an electrically conducting or nonconducting stabilization. The first can be fashioned for example as a metallic jacket surrounding a core of $MgB_2$ material. A combination of, say, iron or steel is advantageously employed here; this can, among other things, prevent degradation of superconductor 1 due to physical-chemical effects, simplify the process of fabricated the needed filament wire and bring about effective mechanical and, under some circumstances, also electrical stabilization. Alternatively, the $MgB_2$ material can also be applied externally on a stabilizer core or formed by reactive means. Other ways of forming the $MgB_2$ material, such as in the shape of thin films or as the bulk material, are also usable according to the invention.

The electric conductivity of such a stabilization connected to the $MgB_2$ material is a question of some importance.

The relationships are clearest in the case where the stabilization has a relatively low electric conductivity (insulator); in the measuring procedure described, the change in the resistance of the $MgB_2$ material is utilized for detecting the liquid level.

If the stabilizer has an electric conductivity, an appropriate shunt resistance given thereby must also be taken into account. The measuring method as described can be implemented in the same way as previously, but the resistance variation between the gas phase and the liquid phase is less clearly marked, depending on the resistance ratio and the ratio of cross-sectional areas. In the combination of $MgB_2$ material (in the normally conducting state) and iron or steel stabilization, cited by way of example, the electric resistivities are roughly of the same order of magnitude at liquid hydrogen temperatures. In principle, very small parallel resistances can also be used, for example in the case of a metallic stabilization of large cross section and/or good but not superconducting electric conductance at low temperatures.

A further important factor is the uniformity of the $MgB_2$ material and, under some circumstances, also that of the stabilizer material and the connection between the two. It is advantageous, in the sense of a simple correlation between the measuring signal and the actual level (linear behavior, etc.), if the form is as uniform as possible over the entire so-called active sensor length. This applies both to the respective cross-sectional areas and the respective electric conductivities, and also to the thermal conductivity and the thermal coupling, both with each other and also to the surrounding fluid. Irregularities can impair the functioning of the sensor, cause errors and, under some circumstances, occasion laborious calibrations or prevent proper functioning altogether.

Controllable heat source 2 is implemented in the most varied ways according to the invention. Possible forms are for example that of a resistive electric heater in the form of a Constantan wire, a heating foil or an electric resistance.

Alternatively, heat input is effected in higher temperature ranges with a heating bridge. Heat is input continuously or under control as required, for example resistively, via radiation or inductively.

An alternative approach to interrupting the superconducting properties of the superconductor by heat input is to block the superconducting phase temporarily or continuously by degrading the $MgB_2$ material on purpose or by applying a magnetic field, in each case in the initial region.

Deliberate permanent degradation is achieved, for example, by deliberate contamination, indiffusion, glow treatment or mechanical deformation of the superconductor.

According to these advantageous developments of the invention without heat input, it is possible to dispense with a heating apparatus entirely, so that technical problems stemming from the power leads and the heat input associated therewith as well as from the control device are also diminished.

The method for determining the level in a liquid hydrogen vessel according to the invention now typically exhibits the following steps:

(a) Inactive condition: no current through the probe, heater 2 (if present) not activated; superconductor 1 is typically in the superconducting state over its full length (in both the liquid phase and the gas phase).

(b) Start of measurement: activation of a current along superconductor 1; activation of heater 2 simultaneously or shortly therebefore or shortly thereafter.

(c) Initial phase: through the effect of heater 2 or other external effects, a region (arbitrarily small) of superconductor 1, typically in the vicinity of the upper end, is brought into the normally conducting state or is permanently in the normally conducting state. Ohmic heat is thereupon generated in this region by the current that flows simultaneously.

(d) Propagation phase: The normally conducting phase propagates along superconductor 1. This takes place because of resistive heat evolution in the regions that have already become normally conducting, in combination with the thermal conductivity within the arrangement. The resistive heat evolution in the $MgB_2$ filament wire and the cooling by the surrounding cold gas or the surrounding liquid, which opposes the heating, must be matched to each other. The speed of propagation, controllable within certain limits through the current, is advantageously in the range from $10^1$ to $10^2$ mm/s.

(e) Attainment of steady state: Propagation slows down more and more upon approach to the liquid hydrogen surface and, given an appropriately adjusted current, ultimately comes to a halt at the height of the phase boundary because of the much more intensive cooling inside the liquid phase. The voltage drop measured across superconductor 1 approaches a constant value.

(f) Measurement phase: As soon as a sufficiently constant value is reached (either after a previously specified wait time to allow for definite attainment of the liquid phase in any operating state of the system, or as detected by tracking the resistance variation), the constant value is determined automatically with voltage measuring apparatus 4 and stored. This measuring mode can be maintained for an extended time (e.g., in order to track any fluctuations in the liquid level), or—once the measurement has been stored—the sensor can be deactivated until a succeeding measurement (for example in order to minimize the heat input into vessel 5).

In the case of laboratory liquid hydrogen cryostats, liquid hydrogen shipping containers or vehicular liquid hydrogen tanks, typical lengths of the required sensor section (the so-called active region) are in the range of approximately 0.2 to 1 m. In an advantageous development, the overall diameter of the above-described steel-stabilized $MgB_2$ filament can be from 10 μm to 500 μm. The cross-sectional area ratios of superconductor to stabilization are from 0.1 to 1:1. In this case current values from 0.1 ampere to 1 ampere and voltages in the range from 0 volt to 20 volts are typically employed.

According to an advantageous development of the invention, filament wire 6 exhibits a diameter of 125 μm and a length of up to 0.5 m.

The maximum possible length of the active zone is not limited in principle and can even be up to several meters. The same wire cross sections and currents are used now, but the maximum voltages show a corresponding linear increase with the active length of the probe.

In an advantageous development, controllable heat source 2 is again deactivated immediately after the beginning of propagation. In view of the drastically reduced solid-state heat capacity in the temperature range under discussion here, the activation of controllable heat source 2 can be limited to a total of, say, 1 to 2 s, with an integrated heat deposition of a few joules.

Alternatively or additionally, once the normally conducting region of superconductor 1 has reached the gas-liquid phase boundary inside vessel 5 (i.e., after the completion of the propagation phase), the applied measuring current through superconductor 1 can be reduced to approximately 0.5 to 0.7 times the initial value, sufficient to maintain the normally conducting zone in a steady state. The heat input to vessel 5 can be significantly reduced in this way, particularly in continuous measurements.

In another advantageous development of the method, conversely, the probe is de-energized again once a measured value has been successfully received and stored (typically after approximately 10 to 20 seconds given the dimensions stated above), and a new measurement can be started and the measured value updated intermittently every $10^2$ seconds to $10^4$ seconds. This is indicated in particular if the level to be measured shows only a very slow variation for reasons having to do with operation.

A further improvement in the method comes about by

I. using interpretation electronics to track the rise in the electric resistance across superconductor 1 starting upon the initialization of the measuring procedure, a rapid, relatively continuous growth in the electric resistance being measurable during the propagation phase, and II. once an approximately constant resistance value has been measured over a series of temporally successive measurement points, because the phase boundary has been reached, and III. once the level determination has taken place, de-energizing superconductor 1 and controllable heat source 2.

At high levels in particular, a significant reduction of the heat input comes about here; what is more, the updated measured value is available as quickly as possible.

Superconductor 1 in most cases will be arranged substantially vertically inside the liquid hydrogen tank. A development consists in mounting the superconductor at, say, an angle of 45° relative to the vertical in order, for example, to attain a higher measurement resolution. Given suitable shapings (flexible design of the probe), the probe could also, for example, follow the interior contour of the tank.

The $MgB_2$ wire is normally connected via a so-called four-conductor hookup. Connected to each of the two ends of the wire are two conventional electric conductors, which effect contacting with the power supply and interpretation unit arranged outside the tank. The desired electric current is led through the $MgB_2$ wire via two of these leads, while the voltage drop and thus the electric resistance of the $MgB_2$ wire can be measured with the other two leads. The advantage of this circuit is essentially the ability to eliminate interfering effects of the leads. According to a preferred development, the above-mentioned resistive initial heater, as shown in FIG. 1, is connected in series and likewise supplied through the said leads in order to eliminate the necessity of further leads.

Besides the wiring described above and illustrated in FIG. 1, however, a multiplicity of other alternatives are possible.

Thus the electric initial heater can be connected separately instead of in series. This permits independent operation, for example in order to minimize the heat input.

If some limitations on measurement accuracy are accepted, a two-conductor technique can be employed as an alternative. It is particularly advantageous additionally to connect the superconductor and the initial heater in series, so that in all just two electrical passthroughs from outside are necessary.

If the probe electronics need not be isolated from the electric ground of tank 5 and further if the number of electrical passthroughs is to be minimized (electrical passthroughs often pose a risk of leakage and are also high in price), a further advantageous development of the invention can be considered, wherein the superconductor and the electric heater are again connected in series and the superconducting wire is led downwardly to the bottom of the tank or to the wall of tank 5 and there electrically contacted with the latter. In this case only two, or even only a single, electrical passthrough to the outside is necessary, corresponding to two-conductor or four-conductor bonding. The return conductor in each case is replaced by tank 5. Because the large-area tank shell and its leads are generally very low in electric resistance, this hardly impairs the measurement accuracy in the ideal case.

Still another development consists in merely bending the superconductor and leading it (electrically insulated from the tank) upwardly again to the height of the initial heater. In this case the other end of the superconductor is also to be provided with an initial heater or provision is to be made for adequate thermal bonding to a common heater.

The normally conducting wiring to the lower connection point of the superconductor according to FIG. 1 is obsolete in this case. Propagation starts in parallel from both ends of the wire, and when the measured value is acquired, the resistance of both normally conducting sections is determined as a sum. Given an ingenious arrangement (vertical sections of superconductor at a certain spacing at suitable places in the tank), it is even possible to compensate for erroneous measurements when the tank is momentarily in an oblique attitude. Further possibilities for combinations of the superconducting filament (which under some circumstances may even be multiply reversed) and wiring are conceivable.

$MgB_2$ as a pure material is relatively brittle and as a consequence not suitable for making a filament wire suitable for this purpose. For this reason, the use of a support material or stabilizer is preferred. Candidates are chromium-nickel steel, iron or other metals and alloys. A possible shaping is to draw a thin filament wire from a tube of chromium-nickel steel and/or iron having a core of $MgB_2$, as described in the following publication: W. Goldacker, S. Schlachter et al., "Development and Performance of Thin Steel Reinforced $MgB_2$ Wires . . . ," Supercond. Sci. Technol. 17 (2004), pp. 363-368.

A problem here is that this so-called mechanical and electrical stabilization represents a shunt resistance, which is unwanted here. In contrast to superconducting probes for liquid helium, where for example pure NbTi filaments can be employed without further stabilization, interpretation and measurement become complicated as a result. This shunt resistance plays no role in the region of the liquid phase of the hydrogen, where the $MgB_2$ is in the superconducting state. The effect of this shunt resistance—which additionally shows a slight temperature dependence—must be taken into account in the region of the gas phase, where the $MgB_2$ material is later to be in the normally conducting state.

It was found that because of the stabilization, $MgB_2$ filament wires as described above are excellently suited to service in the above-described superconducting liquid hydrogen level probes, despite the presence of a shunt resistance. A comparatively thin stabilization is advantageously employed in order to keep the contribution of the shunt resistance relatively slight. For reasons having to do with corrosion and manufacturing, and also in view of the temperature variation of the residual electric resistance at low temperatures, a stabilizing sheath of pure CrNi steel is advantageously employed.

$MgB_2$ as a pure material is sensitive to environmental effects; it is hygroscopic and degrades, for example, in humid ambient air. A further advantage of the stabilizing jacket is that the $MgB_2$ material inside is very well protected against such degradation. In addition, the stabilization also affords protection to the $MgB_2$ material against thermal damage (burn-through) if excessive currents are improperly imposed or if the probe is activated at ambient temperatures.

The method as described imposes comparatively mild requirements on the quality and shaping of the $MgB_2$ material in respect of superconductivity. When used for liquid hydrogen in the range between 1 bar and 7 bar absolute, the vapor-pressure curve predicts that temperatures between 20 K and 29 K will prevail. The reported transition temperatures of $MgB_2$ lie at 39 K to 40 K, and often some kelvins lower when impurities or dopants are present or when intentional mechanical prestress is applied or when interferences act. Measured values for the transition temperature in assembled $MgB_2$ filament wires as described above lie in the range from 32 K to 38 K.

It is known both from theoretical analyses and also from experience with superconducting liquid helium and liquid nitrogen level probes that the transition temperature should optimally lie a few kelvins above the boiling point of the fluid to be measured. In this respect, the $MgB_2$ material described is in excellent accord with the boiling points encountered in liquid hydrogen vessels.

A further advantageous application area for the device according to the invention, having $MgB_2$-based level probes, and the use of the method according to the invention is in connection with liquid neon. Here all states on the vapor-pressure line between the triple point (24.5 K and 0.43 bar for neon), the boiling state at ambient pressure (27.1 K and 1.013 bar for neon) and all the way to significantly elevated pressures (e.g., 34 K and 5.33 bar) are covered in favorable fashion.

In order to implement a liquid neon level probe, the above-described design is essentially kept, or in the favorable case it is possible to use the same probe and similar operating parameters. In particular, the currents are to be varied as appropriate.

All other cryogenic fluids have boiling points that are either too high or, in the case of liquid helium, unfavorably far below the transition temperature of the $MgB_2$ material.

It further follows, however, that no other material of the currently known standard superconducting materials is suitable for implementation of liquid hydrogen level probes or liquid neon level probes, because the transition temperatures are either too low or markedly too high.

The method is not bound to a certain shaping of the $MgB_2$ superconductor. For example, other surrounding stabilization materials, a film of $MgB_2$ on a suitable support material, or a layer of $MgB_2$ on a metal core or other support, or even massive $MgB_2$ bulk material could be used, provided that adequate mechanical and chemical stability is ensured. What has to be kept in mind in this case is the relationship among heat conduction, heat-removing surface area and ohmic heat evolution in the $MgB_2$ material, including any shunt resistances.

The concept of the invention is implemented by way of example with a level measurement using a level measuring probe 13 as illustrated in FIG. 2.

Level measuring probe 13 is so fashioned that filament wire 6 with superconductor 1, electric contacting, resistive initial heater 2 and tensioning apparatus 9 for filament wire 6 are arranged in a mechanically stable enclosing tube 7 having penetrations 10. Enclosing tube 7 has a lower terminating piece 12 on its lower end and an upper connecting piece 11 on its upper end. In the embodiment illustrated, tensioning apparatus 9 is fashioned as a spring, which tensions filament wire 6 and compensates for changes in length due to temperature variations. The spring is fixed in upper connecting piece 11, and the initial region of filament wire 6 with resistive initial heater 2 is arranged at the upper end of filament wire 6. At its lower end, filament wire 6 is electrically contacted with enclosing tube 7 via lower terminating piece 12. Penetrations 10, preferably in the form of holes, are arranged in enclosing tube 7, through which penetrations the cryogenic fluid can make direct contact with filament wire 6. Level measuring probe 13 according to FIG. 2 is electrically connected in two-conductor fashion via electric leads 8, and in comparison with the four-conductor connection it is possible to dispense with two electrical passthroughs. This construction is distinguished by simple and robust fashioning of the probe. The small number of parts and the small number of distinct materials further make possible an economical implementation. In particular, no special requirements apply either to the enclosing tube or to the end pieces: Material, diameter, thickness, surface treatment, tolerances and joining technique can be freely chosen within broad limits.

In the embodiment illustrated, $MgB_2$ filament wire 6, having a suitable diameter and stabilizing component, exhibits an overall diameter of the order of approximately 0.1 mm. Filament wire 6 is held in vertical orientation by a suitable mounting and, as mentioned, is held tensioned inside enclosing tube 7—for example by a mechanical spring 9—without contact except for the electric contacts at both ends. The normally conducting jacket of filament wire 6 provides adequate strength.

Another development consists in fixing superconductor 1 on a planar support structure, which further can simultaneously accommodate conducting paths and connection points for the necessary contacting. Advantages here are simplicity in assembling and inspecting superconductor 1.

As illustrated in FIG. 2, the entire arrangement of superconductor, electric contacting, initial heater and tensioning apparatus is advantageously placed inside the protective jacket, for example in the form of a mechanically stable metallic or nonmetallic enclosing tube 7. The latter protects sensitive filament wire 6 together with the openwork construction against damage during preparation, assembly or operation of the probe. In addition, short circuits between other internals and the filament wire, which typically is not electrically insulated, are avoided; further, enclosing tube 7 can also carry out other tasks (mounting frame for tensioning construction, electric return path from lower contacting point of filament wire). In addition, through suitable shaping of this enclosure, any fluctuations in level can be damped if this is desired, in particular for example through an enclosing tube 7 closed on both sides having well-defined lateral holes 10.

When the electric current is turned on and the initial heater activated, the propagation of the normally conducting zone starts, and the net resistance to be measured over the entire length of the $MgB_2$ filament wire increases until the liquid surface is reached, typically within $10^0$ to $10^2$ s. As soon as a constant resistance value is attained in this way, the normally conducting component of the $MgB_2$ filament and thus the position of the liquid level can be determined by simply measuring the resistance. At typical working currents in the range from 0.1 to 1 A and voltages in the range from 0 to 20 V, the residual resistance over the $MgB_2$ filament can be determined with sufficient accuracy without difficulty and converted directly to a level using known material parameters (electric resistivity, dimensions) or as indicated by separate calibration measurements.

Alternatively, instead of the resistance measurement, the change in inductivity or the change in the screening effect of $MgB_2$ material in the superconducting state and the normally conducting state, respectively, can also be used in order to detect the level, as described in DE 197 55 378 A1 and in DE 198 34 349 A1. Here the coupling is based on a totally different physical principle; the arrangement and shaping of the $MgB_2$ material can be fashioned entirely differently.

In contrast to other methods, such as weighing or capacitive measurement, the physical effect employed here in each of the above-described methods is directly coupled with the value sought, the position of the phase boundary, with the use of a superconducting material; no indirect computational conversion to the liquid component—which under some circumstances may additionally contain errors—is necessary.

A variety of measurement modes are conceivable and can be set via the electric control device:

Imposition of a constant measuring current: Once the phase boundary has been reached, the measured value can be acquired in temporally continuous fashion and the position of the liquid level determined therefrom. It has been found here that the transition between the superconducting zone and the normally conducting zone actually follows any change that takes place in the level. Decreases or increases in the liquid level in the range of some cm per second can be tracked without difficulty. The presence of wave motions up to frequencies of some hertz or "sloshing," for example inside a tank, can be imaged with the probe constructed in this way.

It has been found that a liquid hydrogen level probe constructed in this way exhibits several further advantageous properties:

continuous (nondiscrete) level determination,
high resolution and accuracy of measurement (typically 0.1 to 1 mm),
high reproducibility (typically 0.1 to 1 mm),
high linearity (better than 99.9%)
good reproduction of time-varying or fluctuating liquid level ("edge steepness" of measurement signal typically $10^1$ cm/s),
suitability for liquid neon as well, with appropriate modification.

There are also diverse advantages relating specifically to applicability as a level measuring apparatus in the automotive field.

The superiority over methods and probe constructions currently available is seen with respect to the following characteristics:

no moving parts;
low probe weight, very small "cold mass";
small probe size;
low consumption of materials and simultaneously low material prices;
little effort expended in signal conditioning;
electric currents and voltages in an easily handled range (of the orders of 0.1 A and 1 to 10 V, that is, relatively insensitive to noise and interference; at the same time, high linearity reduces requirements on control and interpretation circuits);
direct measurement of the quantity of interest (here the position of the liquid-gas phase boundary);
moderate heat input in the cryogenic range, variable within broad limits depending on application;
extremely high accuracy and reproducibility;
very slight susceptibility to impairment due to particles or contaminants that may be present in the fluid to be measured;
no known relevant degradation effects.

LIST OF REFERENCE CHARACTERS

1 Superconductor
2 Controllable heat source, resistive initial heater
3 Current source
4 Voltage measuring apparatus, interpretation
5 Liquid hydrogen vessel
6 Filament wire
7 Enclosing tube
8 Electric leads
9 Tensioning apparatus, spring
10 Penetrations, holes in enclosing tube
11 Upper connecting piece
12 Lower terminating piece
13 Level measuring probe

The invention claimed is:

1. A level measuring apparatus for liquid hydrogen or for liquid neon, comprising a filament wire comprising a superconductor based on magnesium diboride $MgB_2$ arranged vertically or inclinedly to the vertical in a liquid hydrogen or liquid neon vessel and a controllable heat source arranged on the upper region of the superconductor, the superconductor being electrically contacted via wiring with a current source as well as a voltage measuring apparatus and the level being measured by measuring a voltage, wherein the wiring electrically contacting the superconductor with the current source, the controllable heat source and a tensioning apparatus for the filament wire are arranged in a mechanically stable enclosing tube having penetrations, the enclosing tube having a lower terminating piece on its lower end and an upper connecting piece on its upper end.

2. A method for level measurement in vessels for the storage of liquid hydrogen or liquid neon, comprising the following steps:

providing a probe comprising a filament wire made of a superconductor based on magnesium diboride $MgB_2$ arranged vertically or inclinedly to the vertical in a liquid hydrogen vessel under a condition of no current flow through the probe, such that the superconductor is in the superconducting state over a length in both a liquid phase and a gas phase of the hydrogen or neon in the vessel;

activating a current flow along the superconductor; and, simultaneously with activating the current flow or shortly therebefore or shortly thereafter, heating an upper portion of the superconductor such that an initial region of the superconductor in a vicinity of the upper portion is in the normally conducting state, and generating ohmic heat in the upper portion;

controlling the ohmic heat to propagate the normally conducting phase along the superconductor through resistive heat evolution in regions that are already normally conducting, in combination with thermal conductivity within the vessel, the resistive heat evolution in the $MgB_2$ filament wire and the cooling by the surrounding gas or liquid, which opposes the heating, being matched to each other to control a speed of propagation within certain limits;

after attainment of a steady state in which propagation comes to a halt at a height of a phase boundary between hydrogen or neon in liquid and gas phases due to intensive cooling inside the liquid phase, and a voltage drop measured across the superconductor approaches a constant value, measuring the voltage drop with a voltage measuring apparatus and storing the voltage drop that is measured to determine a liquid level in the vessel; and tracking any fluctuations in the liquid level by comparing a measured voltage drop to the voltage drop that has been stored or deactivating the probe until a succeeding measurement.

3. The method of claim 2, wherein the step of generating ohmic heat is limited to one to two seconds.

4. The method of claim 2, wherein, after the normally conducting region of the superconductor has reached the gas-liquid phase boundary, the probe is de-energized and a new measurement is started and the measured value is updated intermittently every $10^2$ seconds to $10^4$ seconds.

5. The method of claim 2, further comprising tracking a rise in electric resistance across the superconductor with interpretation electronics starting after the step of activating a current flow along the superconductor, and once an approximately constant resistance value has been measured over a series of temporally successive measurement points, measuring the voltage drop and de-energizing the heat source.

6. The method of claim 2, wherein the upper portion of the probe is temporarily or continuously blocked from having a superconducting phase by deliberately degrading the $MgB_2$ material in the upper portion.

7. The method of claim 2, wherein the upper portion of the probe is temporarily or continuously blocked from having a superconducting phase by application of a magnetic field.

8. The method of claim 2, wherein a working current is in the range between 0.1 to 1 ampere and a voltage in the range from 0 to 20 volts.

9. The method of claim 2, wherein the filament wire comprises the superconductor based on magnesium diboride $MgB_2$ and a jacket made of steel around the superconductor.

10. The method of claim 2, wherein the filament wire comprises the superconductor based on magnesium diboride $MgB_2$ and a jacket made of chromium-nickel steel around the superconductor.

11. The method of claim 2, wherein the filament wire comprises the superconductor based on magnesium diboride $MgB_2$ and a support made of steel supporting the superconductor.

* * * * *